(12) United States Patent
Boyle (10) Patent No.: US 9,267,557 B2
(45) Date of Patent: Feb. 23, 2016

(54) HEAT TRANSFER PREVENTER

(75) Inventor: Brian Lewis Boyle, Farmington Hills, MI (US)

(73) Assignee: Akebono Brake Corporation, Farmington Hills, MI (US)

( * ) Notice: Subject to any disclaimer, the term of this patent is extended or adjusted under 35 U.S.C. 154(b) by 470 days.

(21) Appl. No.: 13/303,987

(22) Filed: Dec. 13, 2011

(65) Prior Publication Data

US 2013/0146409 A1 Jun. 13, 2013

(51) Int. Cl.
*F16D 55/02* (2006.01)
*F16D 55/227* (2006.01)
*F16D 65/78* (2006.01)
*F16D 121/04* (2012.01)
*F16D 125/06* (2012.01)
*F16D 55/00* (2006.01)

(52) U.S. Cl.
CPC ...... *F16D 55/227* (2013.01); *F16D 2055/0066* (2013.01); *F16D 2065/785* (2013.01); *F16D 2121/04* (2013.01); *F16D 2125/06* (2013.01)

(58) Field of Classification Search
USPC ...................... 188/264 G, 361, 370
See application file for complete search history.

(56) References Cited

U.S. PATENT DOCUMENTS

| | | | | |
|---|---|---|---|---|
| 2,298,333 A | * | 10/1942 | Ash et al. ............... | 301/36.1 |
| 2,988,176 A | * | 6/1961 | Du Bois ............... | 188/71.8 |
| 3,155,200 A | * | 11/1964 | Halibrand ............... | 188/196 P |
| 3,277,985 A | * | 10/1966 | Caskey ............... | 188/264 AA |
| 3,592,297 A | * | 7/1971 | Leffert ............... | 188/71.6 |
| 4,036,333 A | * | 7/1977 | Mathauser ............... | 188/264 A |
| 4,064,974 A | * | 12/1977 | Filderman ............... | 188/71.3 |
| 4,147,241 A | * | 4/1979 | Preniczny et al. ........ | 188/264 G |
| 4,401,012 A | * | 8/1983 | Emmett ............... | 92/248 |
| 4,441,592 A | * | 4/1984 | Everett ............... | 188/264 A |
| 4,450,940 A | * | 5/1984 | Herbulot ............... | 188/71.3 |
| 4,485,897 A | * | 12/1984 | Kawaguchi et al. ........ | 188/73.39 |
| 4,513,844 A | * | 4/1985 | Hoffman, Jr. ............... | 188/71.6 |
| 4,537,289 A | * | 8/1985 | VonGrunberg et al. ...... | 188/72.4 |
| 4,572,336 A | * | 2/1986 | Smith et al. ............... | 188/72.6 |
| 4,581,985 A | * | 4/1986 | Villata ............... | 92/248 |
| 4,596,317 A | * | 6/1986 | Nagai et al. ............... | 188/72.4 |
| 4,836,339 A | * | 6/1989 | Kobayashi et al. .......... | 188/73.1 |
| 4,852,700 A | * | 8/1989 | Heibel ............... | 188/73.43 |
| 4,928,579 A | * | 5/1990 | Emmett ............... | 92/248 |
| 4,977,987 A | * | 12/1990 | Schmidt et al. ............ | 188/264 G |
| 4,989,697 A | * | 2/1991 | Denton ............... | 188/264 R |
| 4,995,482 A | * | 2/1991 | Kobayashi et al. .......... | 188/73.1 |
| 5,002,342 A | * | 3/1991 | Dyko ............... | 301/6.91 |
| 5,009,291 A | | 4/1991 | Castellano | |
| 5,031,511 A | * | 7/1991 | Villata ............... | 92/128 |

(Continued)

FOREIGN PATENT DOCUMENTS

JP 64/022657 A 1/1989
WO 2005/057055 A2 6/2005

(Continued)

*Primary Examiner* — Robert A Siconolfi
*Assistant Examiner* — James Hsiao
(74) *Attorney, Agent, or Firm* — The Dobrusin Law Firm, P.C.

(57) ABSTRACT

An article comprising: a heat transfer preventer, the heat transfer preventer comprising: a body portion and one or more convection plates, the one or more convection plates being connected to and extending from the body portion; wherein the body portion includes one or more unitary attachment devices extending therefrom for attachment to a piston, a brake pad, or both.

19 Claims, 6 Drawing Sheets

(56) References Cited

U.S. PATENT DOCUMENTS

| | | | |
|---|---|---|---|
| 5,053,106 A * | 10/1991 | Miller et al. | 216/99 |
| 5,127,494 A * | 7/1992 | Mery | 188/71.1 |
| 5,161,648 A * | 11/1992 | Taig | 188/71.1 |
| 5,248,013 A * | 9/1993 | Hogue et al. | 188/264 G |
| 5,332,067 A * | 7/1994 | Prud'homme | 188/73.1 |
| 5,355,774 A | 10/1994 | Ditlinger | |
| 5,427,213 A * | 6/1995 | Weiler et al. | 188/250 E |
| 5,487,453 A * | 1/1996 | Moroni | 188/264 G |
| 5,507,370 A * | 4/1996 | White et al. | 188/264 G |
| 5,575,358 A * | 11/1996 | McCormick | 188/71.6 |
| 5,660,253 A * | 8/1997 | Rike | 188/264 G |
| 5,706,917 A * | 1/1998 | Matsuzaki | 188/73.38 |
| 5,713,435 A * | 2/1998 | Schneider et al. | 188/71.6 |
| 5,845,747 A * | 12/1998 | Rike et al. | 188/72.4 |
| 5,988,044 A * | 11/1999 | Meyer | 92/176 |
| 6,095,712 A * | 8/2000 | Ridley et al. | 403/23 |
| 6,206,151 B1 * | 3/2001 | Nakamura | 188/250 B |
| 6,283,258 B1 * | 9/2001 | Chen et al. | 188/250 E |
| 6,305,870 B1 * | 10/2001 | Mita et al. | 403/254 |
| 6,311,806 B1 * | 11/2001 | Gonzalez et al. | 188/71.6 |
| 6,401,596 B1 | 6/2002 | Mashford | |
| 6,446,766 B1 * | 9/2002 | Cornolti et al. | 188/71.6 |
| 6,729,445 B1 * | 5/2004 | Qian et al. | 188/264 G |
| 7,337,884 B2 * | 3/2008 | Paulik | 188/264 A |
| 7,344,006 B2 | 3/2008 | Edmisten | |
| 7,905,335 B2 | 3/2011 | Demers | |
| 8,210,329 B2 * | 7/2012 | Demers | 188/264 R |
| 8,550,220 B2 * | 10/2013 | Iwai et al. | 188/264 A |
| 2004/0094375 A1 | 5/2004 | Qian et al. | |
| 2005/0194220 A1 | 9/2005 | Edmisten | |
| 2005/0284708 A1 * | 12/2005 | Christ | 188/71.6 |
| 2006/0266600 A1 * | 11/2006 | Demers | 188/264 R |
| 2007/0034462 A1 * | 2/2007 | Themelin et al. | 188/264 R |
| 2009/0001678 A1 * | 1/2009 | Sumey et al. | 280/93.512 |
| 2009/0242334 A1 * | 10/2009 | Moore | 188/24.22 |
| 2010/0170755 A1 * | 7/2010 | Biggs | 188/72.4 |
| 2012/0181123 A1 * | 7/2012 | Ruiz et al. | 188/72.4 |
| 2012/0193175 A1 * | 8/2012 | Wen | 188/71.6 |

FOREIGN PATENT DOCUMENTS

| | | |
|---|---|---|
| WO | 2006/127877 A1 | 11/2006 |
| WO | 2010/060191 A1 | 6/2010 |

\* cited by examiner

Fig-9

HEAT TRANSFER PREVENTER

FIELD

The present teachings generally relate to a device that prevents heat transfer from one component to another component, and more specifically prevents heat transfer from a brake pad during a brake apply and/or after a brake apply to a piston so that the brake fluid does not boil.

BACKGROUND

The present teachings are predicated upon providing an improved disc brake system for use with vehicles. For example, the disc brake system may be used with almost any vehicle (e.g. car, truck, bus, train, airplane, or the like). Alternatively, the disc brake system may be integrated into assemblies used for manufacturing or other equipment that require a brake such as a lathe, winder for paper products or cloth, amusement park rides, or the like. However, the present teachings are most suitable for use with a passenger vehicle (i.e. a car, truck, sports utility vehicle, or the like).

Generally, a braking system includes a rotor, a caliper body, a support bracket, an inboard brake pad, and an outboard brake pad that are on opposing sides of the rotor. The caliper body further includes one or more fingers, a piston bore, and a bridge that connects the one or more fingers to the piston bore. The piston bore houses a piston. The piston bore has a bore axis that the piston moves along during a brake apply and a brake retract. The piston bore may include a fluid inlet, a closed wall, a front opening, and a cylindrical side wall that includes a seal groove located near the front opening. Typically, the fluid inlet is located in the closed wall of the piston bore so that when pressure is applied the fluid will flow into the piston bore. During a pressure apply the fluid will push the piston towards the front opening and into contact with a brake pad. However, during a pressure apply the piston and/or brake fluid may be heated through heat transfer from the brake pad. Some of the heat may be dissipated through movement of the vehicle, but when the brakes are aggressively applied to slow the vehicle or an extended brake apply is used, and then the vehicle is stopped for an extended period of time the heat from the brake pads may boil the brake fluid. The boiling of the brake fluid may damage the braking system.

Generally, most systems do not include any device that cools the brake fluid and/or attempts to prevent heat transfer from the brake pads to the brake fluid. Examples of such braking devices are disclosed in U.S. Pat. Nos. 4,401,012; 4,928,579; 4,995,482; 5,009,291; 5,355,774; 5,988,044; 6,401,596; 7,344,006; and 7,905,335; U.S. Patent Application Publication Nos. 2004/0094375 and 2005/0194220; and foreign Patent Document Nos. JP64/022657; WO2005057055; and WO2006127877 all of which are expressly incorporated herein by reference for all purposes.

What is needed is a heat transfer preventer that can attach to the piston, the brake pad, be used as a shim between the piston and a brake pad, or a combination thereof so that heat is not transferred through the piston into the brake fluid. What is needed is a device that assists in preventing brake fluid from becoming heated after an extended brake apply or an aggressive brake apply, when movement of the vehicle is subsequently terminated. What is further needed is a heat transfer preventer that fits into a small packing space while maximizing conduction and/or convection of heat away from the brake pads, the piston, or the brake system. What is further needed is a device that prevents heat transfer from the brake pads to the piston, and can withstand repeated brake applies.

SUMMARY

One possible embodiment of the present teachings include: an article comprising: a heat transfer preventer, the heat transfer preventer comprising: a body portion and one or more convection plates, the one or more convection plates being connected to and extending from the body portion; wherein the body portion includes one or more unitary attachment devices extending therefrom for attachment to a piston, a brake pad, a shim, or a combination thereof.

One possible embodiment of the present teachings include: a brake system comprising: a heat transfer preventer of the teachings herein, the heat transfer preventer comprising: a body portion and one or more convection plates, the one or more convection plates being connected to and extending from the body portion; wherein the body portion includes one or more unitary attachment devices extending therefrom for attachment to a piston, a brake pad, or both; a caliper housing, the caliper housing including: one or more fingers; one or more piston bores, the one or more piston bores each include: a piston and brake fluid; a bridge connecting the one or more fingers and the one or more piston bores; wherein the heat transfer preventer is attached to the piston via the one or more unitary attachment devices so that the heat transfer preventer and the piston move in unison during a brake apply, a brake retract, or any time therebetween.

The teachings herein surprisingly solve one or more of these problems by providing a heat transfer preventer with multiple convection plates that move heat away from the heat transfer preventer, the piston, the brake pads, or a combination thereof. The heat transfer preventer further includes internal fingers and external fingers that provide further convection points to remove heat from the heat transfer preventer and the brake pads. The heat transfer preventer as taught herein includes a structure that disrupts the transfer of heat from the brake pads through the heat transfer preventer to the piston and/or brake fluid. The heat transfer preventer may further include a support washer and an insulator ring. The support washer and the insulator ring may provide additional layers that inhibit heat transfer from the brake pads to the piston and/or brake fluid while preventing bending and/or deformation of the heat transfer preventer. The teachings herein surprisingly solve one or more of these problems by providing: a heat transfer preventer that may attach to the piston, the brake pad, be used as a shim between the piston and a brake pad, or a combination thereof so that heat is not transferred through the piston into the brake fluid; a device that assists in preventing brake fluid from becoming heated after an extended brake apply and/or an aggressive brake apply, when movement of the vehicle is subsequently terminated; a heat transfer preventer that fits into a small packing space while maximizing conduction and/or convection of heat away from the brake pads, the piston, or the brake system; a device that prevents heat transfer from the brake pads to the piston, and can withstand repeated brake applies; or a combination thereof.

DETAILED DESCRIPTION

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The teachings herein provide for a heat transfer preventer, which maximizes heat transfer to the surrounding environment while minimizing heat transfer from the brake pads to the piston and/or brake fluid. The heat transfer preventer may be of any shape and size so that it fits within the packing space of virtually any disc brake system. The heat transfer preventer may be of any shape and size so that the heat transfer preventer fits into an existing brake system without performing any modifications to the brake system. The heat transfer preventer may be modified: so that the heat transfer preventer may fit in virtually any existing disc brake system; so that the heat transfer device maintains a minimal packing space while maximizing heat transfer to the surrounding environment; or both. The heat transfer may be used in single piston calipers. The heat transfer preventer may be used in multiple piston systems. The heat transfer preventer may be used in a brake system that includes one or more pistons. The heat transfer device may include: a body portion, one or more convection plates, one or more unitary attachment devices, one or more support washers, one or more insulator rings, or a combination thereof. Preferably, the heat transfer preventer includes at least a body portion with one or more unitary convection plates attached to the body portion, and one or more unitary attachment devices attached to the body portion.

The body portion may be of any size and shape so that the body portion prevents heat from being transferred from one or more of the brake pads to the piston, the brake fluid, or both. The body portion may be of any size and shape so that the body portion fits within the packing space of the brake system. The body may be of any size and shape so that the body portion fits between a brake pad and the piston. The body portion may be made of any material so that the body portion assists in preventing heat transfer. The body portion may be made of an insulating material so that heat transfer between a brake pad and the piston is inhibited. The heat transfer preventer may be made of any material that inhibits heat from transferring from the brake pads to the piston and/or the brake fluid. The heat transfer preventer may be made of a material with a high thermal conductivity. The heat transfer preventer may be made of a material that is resistant to corrosion and/or damage when contacted with a fluid. Preferably, the heat transfer preventer is made of a material that is resistant to corrosion and/or damage when contacted by water, salt water, brake fluid, or a combination thereof. The body portion may be made of any material that transfers heat from the body portion to the convection plates so that heat may be dissipated from the heat transfer preventer. The heat transfer preventer may be made of one piece of material. The heat transfer preventer may be made of a polymeric material. The heat transfer preventer may be made of one unitary piece of material. The heat transfer preventer may be made of a shaped piece of material. The heat transfer may be made of a molded piece of material (e.g., blow molded, injection molded, the like, or a combination thereof). The heat transfer preventer may be stamped. The heat transfer preventer may be made from one single sheet of material. The heat transfer preventer may be made from a sheet of metal. Preferably, the heat transfer preventer may be made of steel. More preferably, the heat transfer preventer may be made of low carbon steel. The body portion may be made of any material that will withstand repeated brake applies. The heat transfer preventer may be made of any material that may withstand about 1000 brake applies or more, about 10,000 brake applies or more, about 100,000 brake applies or more, or even about 1,000,000 brake applies or more.

The heat transfer preventer may be of any shape that allows it to perform the functions recited herein, for example, attaching the heat transfer preventer to a brake system; insulating the piston and/or brake fluid from heat transfer from the brake pads; attaching the convection plates to piston; attaching the body portion to the brake pads and/or a shim, attaching the insulating ring, attaching the support washer, or a combination thereof. The body portion may be square, oval, diamond, round, or a combination thereof. Preferably, the body portion may be generally round. More preferably, the body portion may be generally toroidially shaped (i.e., shaped like a doughnut). Most preferably, the both portion may be generally toroidially shaped and include slots that extend from an outside edge towards a center hole.

The body portion may include a center hole (i.e., have an open center). The center hole may be free of any components. Preferably, the center hole includes an internal finger, an external finger, or both. More preferably, the center hole includes internal fingers that extend from an edge of the body portion. The body portion may include internal fingers, external fingers, or both that extend from any location of the body portion. The body portion may be generally flat. The body portion may be free of holes. The body portion may be free of holes that align with the slide pins (i.e., the heat transfer preventer is not attached to the brake system via the slide pins). The body portion may be free of attachment to the brake system via any separate fasteners. For example, the heat transfer preventer may be attached to the brake system via only components that are a unitary part of the heat transfer preventer and may not require any additional parts or fasteners for attachment. The body portion may include one or more through holes. Preferably, the body portion includes through holes so that the through holes interrupt and/or disrupt heat transfer through the heat transfer preventer. The one or more through holes may disrupt direct transfer of heat from the heat transfer preventer to the piston so that heat travels around the holes in order to travel from the heat transfer preventer to the piston or vice versa. The one or more through holes may create an air gap between a portion of the piston and the heat transfer preventer so that any thermal conductivity that occurs is due to the transfer of heat from the heat transfer preventer through the air and then to the piston or vice versa. The one or more through holes may reduce the contact surface area between the body portion and a piston, support washer, insulator ring, brake pad, or a combination thereof. The one or more through holes, slots, or a combination thereof may reduce the total surface area of the heat transfer preventer that contacts a piston, a support washer, an insulator ring, a brake pad, or a combination thereof so that the amount of heat transferred from the brake pad to the piston, the brake fluid, or both is minimized and/or substantially reduced. The body portion may include one large center hole and one or more smaller through holes in the region surrounding the center hole.

The center hole may be created by the removal of material to create the internal fingers. The center hole may decrease the total surface area of the heat transfer preventer. The center hole may be used to attach the heat transfer preventer to a brake component. The center hole may be used to attach the heat transfer preventer to a brake pad, a shim, a piston, or a combination thereof. The body portion may include one or more portions where material has been removed from the body portion. The body portion may include slots.

The body portion may include one or more slots. The slots may be of any shape and size so that the body portion assists in preventing heat transfer. The slots may be square, round, oval, or a combination thereof. The slots may be proximate to an edge of the body portion. The slots may contact an edge of the body portion. The slots may extend from an edge of the body portion. The slots may be an absence of material. The slots may interrupt and/or disrupt heat transfer between the brake pad and the piston and/or brake fluid. The slots may be formed by material that is cut and bent out of the plane of the body portion so that one or more unitary attachment devices may be created. The one or more slots may include excess material that angles at a substantially right angle to the body portion forming an external finger. Preferably, the slots are formed on an external edge of the body portion. For example, the body portion may include a hole in the center and the slots are located proximate to or extend from an edge of the body portion opposite the hole in the center of the body portion and are bent away from the edge towards the center hole. The slots may be formed in an outside region of the body portion. Preferably, the slots may be formed by material that is cut and bent so that one or more external fingers are formed. The slots may be formed during a stamping process. The slots may be formed during a molding process. Preferably, the slots are part of a unitary structure. The slots may form one or more of the unitary attachment devices. The unitary attachment devices may be an internal finger, an external finger, the center hole, or a combination thereof.

The external fingers may be formed on the outer edge, external edge, external region, or a combination thereof of the body portion. For example, the external fingers extend from a region proximate an outside edge of the body portion and turn at substantially a right angle with the body portion. Preferably, the external fingers are made of the same material as the body portion, the one or more convection plates, internal fingers, any other additional pieces of the heat transfer preventer, or a combination thereof. More preferably, the external fingers may be made of material removed from the body portion (i.e., material bent out of the plane of the body to form the slots). For example, the body portion may be formed during a stamping process and the external fingers may be cut out of the body portion and folded simultaneously forming the external fingers and the one or more slots. Preferably, the heat transfer preventer is a unitary structure with a body portion and the external fingers protrude from the body portion. The external fingers may be made of any material that is resistant to plastic deformation. The external fingers may be made of any material that exhibits some elastic deformation. The body portion may include about 1 or more, about 3, or more, or about 5 or more external fingers. The body portion may include about 11 or less, about 9 or less, or about 7 or less external fingers. The body portion may include between about 2 and about 6 external fingers (i.e., about 3). The plane of the one or more external fingers may generally form an angle with the body portion. The one or more external fingers may form an angle of about 60 degree or greater, about 75 degrees or greater or preferably about 85 degrees or greater with the body portion. The one or more external fingers may form an angle of about 135 degrees or less, about 115 degrees or less, or about 105 degrees or less with the body portion. The external fingers may form an angle with the body portion of between about 60 degrees and about 135 degrees or preferably about 75 degrees and about 105 degrees. The angle of the external fingers may vary by about 1 degree to about 5 degrees so that the external finger can be compressed to fit in the piston and then expand to form a compression fit with an internal wall of the piston. The one or more external fingers may be flat (i.e., the external fingers may extend in one plane).

The one or more external fingers may be generally coplanar along the length and width of each external finger. The one or more external fingers may include a contour. The one or more external fingers may include a lip along a portion of the external finger so that the lip fits into mating region in a piston such as a ring or a groove. The one or more external fingers may form an interference fit with the mating region of a piston. Preferably, the one or more external fingers may include a snap that snaps into a groove of the piston and assists in holding the heat transfer preventer on the piston. The snaps may be a projection on the external fingers. The snaps may be a bend in the external fingers. The external fingers may be stamped to form the snap. The external fingers may be creased to form the snap. The one or more external fingers may include any feature that assists in attaching the heat transfer preventer to the piston and/or a brake pad so that the heat transfer preventer moves with the piston and/or the brake pad.

The one or more external fingers may matingly fit around the outside of the piston. Preferably, the one or more external fingers may matingly fit into an open center portion of the piston so that the lip of the external finger removably attaches the heat transfer preventer to the piston. More preferably, the one more external fingers may create a compression fit with an internal wall of a piston so that the pressure of the external finger against the internal wall of the piston removably attaches the heat transfer preventer to the piston. Most preferably, the one or more external fingers may form a compression fit with an internal wall of the piston and a lip on the one or more external fingers may assist in attaching the heat transfer preventer to the piston. For example, the one or more external fingers may be compressed so that they fit in the internal region of the piston and the one or more external fingers create a reactionary force against the internal wall of the piston holding the heat transfer preventer in place. The external fingers may be free of attachment with a piston. The external fingers may position the heat transfer preventer relative to the one or more pistons without attaching the heat transfer preventer to the one or more pistons. The external fingers may be used to hold and/or position the support washer, the insulating ring, or both relative to the body portion of the heat transfer preventer. The external fingers may form a compression fit with the support washer, the insulating ring, or both so that the support washer, the insulating ring, or both are attached to the heat transfer preventer. The external fingers may attach the heat transfer preventer to a piston, a support washer, an insulating ring, or a combination thereof. The external fingers may bend toward a center region of the body portion and proximate to one or more internal fingers. The external fingers may extend form an outside region of the body portion into contact with an internal wall of a piston and juxtaposed to an internal finger. The one or more external fingers may contact an inner wall of a piston substantially along a length and a width of the external finger. A portion of the external finger may contact an inner wall of the piston. The one or more external fingers may be substantially parallel to one or more internal fingers of the heat transfer preventer.

The one or more internal fingers may be of any shape and size so that a large hole is created in the center of the heat transfer preventer. The one or more internal fingers may be of any shape and size so that the internal fingers assist in heat dissipation. The one or more internal fingers may be formed of the same unitary piece of material as the body portion, the external fingers, the one or more convection plates, any other additional pieces of the heat transfer preventer, or a combination thereof. The one or more internal fingers may be bent out of the plane of the body portion so that a large hole is created in the center of the body portion. The plane of the one or more internal fingers may generally form an angle with the body portion. The one or more internal fingers may form an angle of about 60 degree or greater, about 75 degrees or greater or preferably about 85 degrees or greater with the body portion. The one or more internal fingers may form an angle of about 135 degrees or less, about 115 degrees or less, or about 105 degrees or less with the body portion. The one or more internal fingers may form an angle with the body portion of between about 60 degrees and about 135 degrees or preferably about 75 degrees and about 105 degrees. The one or more internal fingers may extend from an internal edge of the body portion. For example, the portion of the internal fingers that connects to the body portion is surrounded on all sides by the body portion. It is contemplated, however, that the internal fingers may not be surrounded on all sides by the body portion. For example, the internal fingers may be substantially surrounded by the body portion because the body portion forms a "U" or "C" shape or one or more of the slots may extend from an external edge of the body portion to an internal edge of the body portion so that the body portion does not include a completely surrounded center portion. The internal fingers may contact an inside wall of the piston. Preferably, the internal fingers may be free of contact with an inside wall of the piston. The internal fingers may be located juxtaposed to an inside wall of the piston, an external finger, or both in an installed position, uninstalled position, or both. The body portion may include about 1 or more, about 3, or more, or about 5 or more internal fingers. The body portion may include about 11 or less, about 9 or less, or about 7 or less internal fingers. The body portion may include between about 4 and about 8 internal fingers (i.e., about 5). The internal fingers may be substantially parallel to the external fingers. The internal fingers may assist the one or more convection plates in removing heat from the heat transfer preventer.

The one or more convective plates may extend from the body portion. The one or more convective plates may extend from any region of the body portion so that the convective plates assist is removing heat from the heat transfer preventer, the brake pads, the piston, the brake fluid, or a combination thereof. The one or more convection plates may extend from an external edge of the body portion. The one or more convection plates may be formed of the same unitary piece of material as the body portion, the internal fingers, the external fingers, any other additional pieces of the heat transfer preventer, or a combination thereof. The body portion may include about one convection plate or more, about two convection plates or more, or about three convection plates or more. The body portion may include about ten convection plates or less, about eight convection plates or less, about six convection plates or less, about five convection plates or less, or about four convection plates or less. The convection plates may include ribs or fins on the convection plate. Preferably, the convection plates may be free of ribs or fins. The convection plates may only be a base. For example, the convection plates may be free of fins attached to the convection plates (i.e., a heat sink). The convection plates may be free of an additional heat sink. The convection plates may be the heat sink.

Two or more convection plates may be combined together, formed as one unitary piece, or both that expands between two or more body portions forming a connection region. The convection plates may extend between two body portions forming a connection region. The connection region may serve as a convection plate and as a connector between two body portions so that one unitary heat transfer preventer is formed that may be used with a two piston brake assembly. The connection region may form a dual heat transfer preventer. The connection region may be formed when the dual heat transfer preventer is created from one sheet of material. The dual heat transfer preventer may include all of the same features taught herein for a single piston heat transfer preventer. The connection region may serve the same function as a convection plate in addition to attaching two body portions together. The connection region may be substantially flat. The connection region may be substantially coplanar with the body portion. The connection region the convection plates or a combination thereof may be in one or more planes. The one or more convection plates may extend in the same plane as the body portion. Preferably, at least a portion of the one or more convection plates are in the same plane as the body portion and at least a portion of the one or more convection plates are in a different plane than the body portion. The convection plate may extend into at least two planes. The convection plate may include an angled portion and a coplanar portion.

The coplanar portion may be any part of the one or more convection plates that extends from the body portion. The coplanar portion may attach the angled portion to the body portion. The coplanar portion may extend the angled portion out and around structures of the brake system so that the angled portion can assist in cooling the heat transfer preventer. The coplanar portion may attach directly to the body portion and extend from the body portion in the same plane as the body portion. The coplanar portion may be located between a body portion and an angled portion. The angled portion may be indirectly attached to the body portion. The angled portion may be directly attached to the coplanar portion. The angled portion may form an angle with the coplanar portion. The angle between the coplanar portion and the angled portion may be any angle so that the convection plate assists in cooling the heat transfer preventer. The angle between the coplanar portion and the angled portion may be any angle so that the convection plate fits within the packing space of the braking system. The angle between the coplanar portion and the angled portion may be about 25 degrees or greater, about 40 degrees or greater, preferably about 60 degrees or greater, or more preferably about 75 degrees or greater. The angle between the coplanar portion and the angled portion may be about 175 degrees or less, about 150 degrees or less, about 135 degrees or less, or even about 105 degrees or less. The angle between the angled portion and the coplanar portion may be between about 60 degrees and about 175 degrees, preferably between about 75 degrees and about 135 degrees, and more preferably between about 80 degrees and about 105 degrees. The angled portion, the coplanar portion, or both may include one or more features. The features may include one or more: holes, slots, cuts, slits, cutouts, or a combination thereof to improve convective cooling of the convection plates. The features may increase surface area of the convection plate. The features may increase heat transfer to the surroundings. The features may disrupt heat transfer through the heat transfer preventer to the piston and ultimately the brake fluid. The features may be any size and shape so that heat is dissipated and is not transferred to the brake fluid. The heat transfer preventer includes a thickness.

The thickness of the heat transfer preventer may be any thickness so that the heat transfer preventer fits in the brake system. Preferably, the thickness of the heat transfer preventer is any thickness so that the heat transfer preventer fits between the piston and a brake pad. The thickness of the heat transfer preventer may be any thickness that allows the heat transfer preventer to cool quickly. The thickness of the heat transfer preventer may be any thickness so that the heat transfer preventer remains rigid during a brake apply, a brake retract, and any time therebetween. The thickness of the heat transfer preventer may be any thickness so that the heat transfer preventer self-attaches to a brake component (e.g., a piston). Preferably, the heat transfer may be as thin as possible so that the heat transfer preventer cools quickly, and the heat transfer preventer may be thick enough so that the heat transfer preventer is rigid enough to maintain its shape during a brake apply, a brake retract, and anytime therebetween. The heat transfer preventer may have a thickness of about 0.5 mm or more, about 0.8 mm or more or about 0.95 mm or more. The heat transfer preventer may have a thickness of about 3.0 mm or less, about 2.0 mm or less, or about 1.5 mm or less. The heat transfer preventer may have a thickness of between about 0.5 mm to about 2.0 mm and preferably between about 0.75 mm and about 1.25 mm (i.e., about 1.0 mm). The heat transfer preventer may include a coating.

The coating may be any coating that inhibits the transfer of heat. The coating may be on all or a portion of the heat transfer preventer. For example, the coating may be on the body portion and the convection plates may be free of the coating. The coating may be located on the front of the heat transfer preventer, the back of the heat transfer preventer, or both. The coating may be made of any material that assists in preventing heat transfer. The coating may be a polymeric material. The coating may be plastic, rubber, an insulating material, or a combination thereof. The coating may assist in structurally reinforcing the heat transfer preventer.

The heat transfer preventer and the piston may be separated by a support washer. The support washer may be any device that provides additional structure to the heat transfer preventer. The support washer may be any size and thickness so that the support washer fits into the packing space of the brake system. The support washer may be of any size and shape so that the support washer fits between the piston and the brake pads. The thickness of the support washer and the thickness of the heat transfer preventer may be any thickness so that the combined thickness of the support washer and the heat transfer preventer fit in the brake system between the piston and the brake pad. The thickness of the support washer and the heat transfer preventer may have a ratio. The ratio of the support washer thickness to the thickness of the heat transfer preventer may be about 1:1.5 or less, about 1:1.2 or less, or about 1:1 or less. The ratio of the support washer thickness to the thickness of the heat transfer preventer may be about 3:1 or less, about 2:1 or less, or about 1.8:1 or less (i.e., about 1.5:1). The support washer may have a thickness of about 0.5 mm or more, about 1.0 mm or more, or about 1.2 mm or more. The support washer may have a thickness of about 3.0 mm or less, about 2.5 mm or less, or about 2.0 mm or less. The thickness of the support washer may be between about 0.5 mm and about 3.0 mm, preferably between about 1.0 mm and about 2.5 mm, more preferably between about 1.2 mm and about 2.2 mm, and most preferably between about 1.5 mm and about 2.0 mm. The support washer may be any size and shape so that the support washer fits within the packing space of the braking system. The support washer may be any size and shape so that the support washer fits between a piston and a brake pad without interfering with the function of other brake components.

The support washer may be a square, an oval, a circle, a diamond, or a combination thereof. Preferably, the support washer may be toroidally shaped. The support washer may have an inner diameter. The inner diameter of the support washer may be any diameter so that a portion of the heat transfer preventer may pass through the support washer and contact the piston. Preferably, the inner diameter of the support washer is large enough so that one or, more external fingers may pass through the inner diameter and attach the heat transfer preventer and the support washer to a piston. The inner diameter may be about 15 mm or more, about 20 mm or more, about 030 mm or more, about 40 mm or more, or about 45 mm or more. The inner diameter may be about 100 mm or less, about 75 mm or less, or about 60 mm or less. The inner diameter may vary from application to application. The inner diameter may be between about 10 mm and about 60 mm and preferably between about 18 to about 52 mm. The support washer may have an outer diameter. The outer diameter may be any diameter so that the support washer fits within the brake housing and the angled portion of the heat transfer preventer extends around the outer diameter of the heat transfer preventer. The outer diameter may be any size so that the support washer fits between the piston and the heat transfer preventer. Preferably, the outer diameter may be large enough so that the support washer covers the piston boot so that the piston boot is free of contact with the heat transfer preventer. The outer diameter of the heat transfer preventer may vary as the size of the piston boot varies. The outer diameter may be about 30 mm or more, about 35 mm or more, about 45 mm or more, about 55 mm or more, about 65 mm or more, or even about 70 mm or more. The outer diameter may be about 125 mm or less, about 100 mm or less, or about 80 mm or less. The outer diameter of the piston boot may be between about 25 mm and about 100 mm and preferably between about 35 mm and about 75 mm.

The support washer may be made of any material that is rigid so that the support washer provides additional support to the heat transfer preventer. The support washer may be made of any material that assists the heat transfer preventer in resisting bending and deformation. The support washer may be made of any material that resists heat transfer from the heat transfer preventer to the piston and/or brake fluid. The support washer may be made of a material that blocks the transfer of heat from the heat transfer preventer to the piston and/or brake fluid. Preferably, the support washer may be made of a material with a lower thermal conductivity than the heat transfer preventer. The support washer may be made a polymeric material. The support washer may be made of a rigid plastic. Preferably, the support washer may be made of metal. More preferably, the support washer may be made of stainless steel. Most preferably, the support washer may be made of Austenitic Stainless steel. The support washer may directly contact the heat transfer preventer. The support washer may directly contact the piston. The support washer may be located adjacent to the piston. The support washer may be separated from the piston by an insulator ring.

The insulator ring may be any device that may be placed between a brake component and a support washer, a heat transfer preventer, or both. Preferably, the insulator ring may be placed between a piston and a support washer, a heat transfer preventer, or both. The insulator ring may be any shape and size so that the insulator ring fits in the brake system. Preferably, the insulator ring may be of any shape and size so that the insulator ring fits between a piston and a support washer, a heat transfer preventer, or both. The insulator ring may be made of any material. The insulator ring may be made of any material that acts as an insulator. Preferably, the insulator ring may be made of a material with a low thermal conductivity. More preferably, the insulator ring may be made of a phenolic plastic.

The heat transfer preventer may be installed in the braking system so that it is attached only to the piston, a brake pad, a pressure plate, a shim, another brake component, or a combination thereof. Preferably, the heat transfer preventer attaches to the pressure plate of a brake pad, a piston, or both. The heat transfer preventer may be attached to a piston via the one or more external fingers and a brake pad, a shim, or both via a center hole in the heat transfer preventer and a projection from the brake pad, the shim, or both. The heat transfer preventer may be attached to the piston, the brake pad, the shim, another brake component, or a combination thereof using one or more of the unitary attachment devices discussed herein. The heat transfer preventer may be attached to the piston, the brake pad, the shim, another brake component, or a combination thereof using a combination of the one or more of the unitary attachment devices discussed herein and a fastener. For example, the brake pad, shim, or both may include a fastener that projects out from the friction material, the pressure plate, a shim, or a combination thereof through a center hole in the heat transfer preventer so that the heat transfer preventer is secured to the brake pad. The fastener may be a separate piece. Preferably, the fastener may be a unitary part of the brake pad. The fastener may be any faster that may be used to connect the heat transfer preventer to the piston, the brake pad, the shim, another brake component, or a combination thereof. The fastener may be a screw, a threaded portion, a rivet, a flanged device, or a combination thereof. Preferably, the fastener is a rivet like device that is extended through a center hole of the heat transfer preventer and flared so that the fastener secured the heat transfer preventer in place.

The brake system may include a shim. The shim may be any component that may be placed between a brake pad and another brake component such as a support washer, an insulator ring, a piston, or a combination thereof. The shim may be a noise insulating shim. The shim may be made of any material that reduces the distance between the brake pad and the piston. The shim may be made of any material that reduces noise, squeal, or both during a brake apply, a brake retract, or any time therebetween. The shim may be made of metal. The shim may be made of plastic. The shim may be made of rubber. The shim may be made of steel. The shim may be made of stainless steel. The shim may be made of an insulating material. The shim may be made of a conductive material. The shim may have a thickness of about 0.1 mm or more, about 0.5 mm or more, or about 1.0 mm or more. The shim may have a thickness of about 5 mm or less, about 4 mm or less, about 3 mm or less, or about 1 mm or less. The shim may have a thickness of between about 0.1 mm and 5 mm, about 0.5 mm and 4 mm, or about 1 mm and 3 mm.

The heat transfer preventer, support washer, insulator ring, or a combination thereof may be used in virtually any braking system without any adaptation to the braking system. Preferably, the braking system is a floating caliper style brake system. The braking system may be a fixed caliper (i.e., the caliper housing does not slide). The bridge of the caliper may include one or more windows. The one or more windows may be in substantial alignment with one or more piston bores. The convection plates of the heat transfer preventers when attached to a piston may extend into the one or more windows. The convection plates of the heat transfer preventers may extend through the one or more windows. The one or more convection plates may extend around an outside of the caliper housing. The caliper may include a center recess between the piston bores. The one or more convection plates may extend into the center recess in the caliper housing. The heat transfer preventer may contact the caliper housing. Preferably, the heat transfer preventer may be free of contact with the caliper housing.

Figure 1:
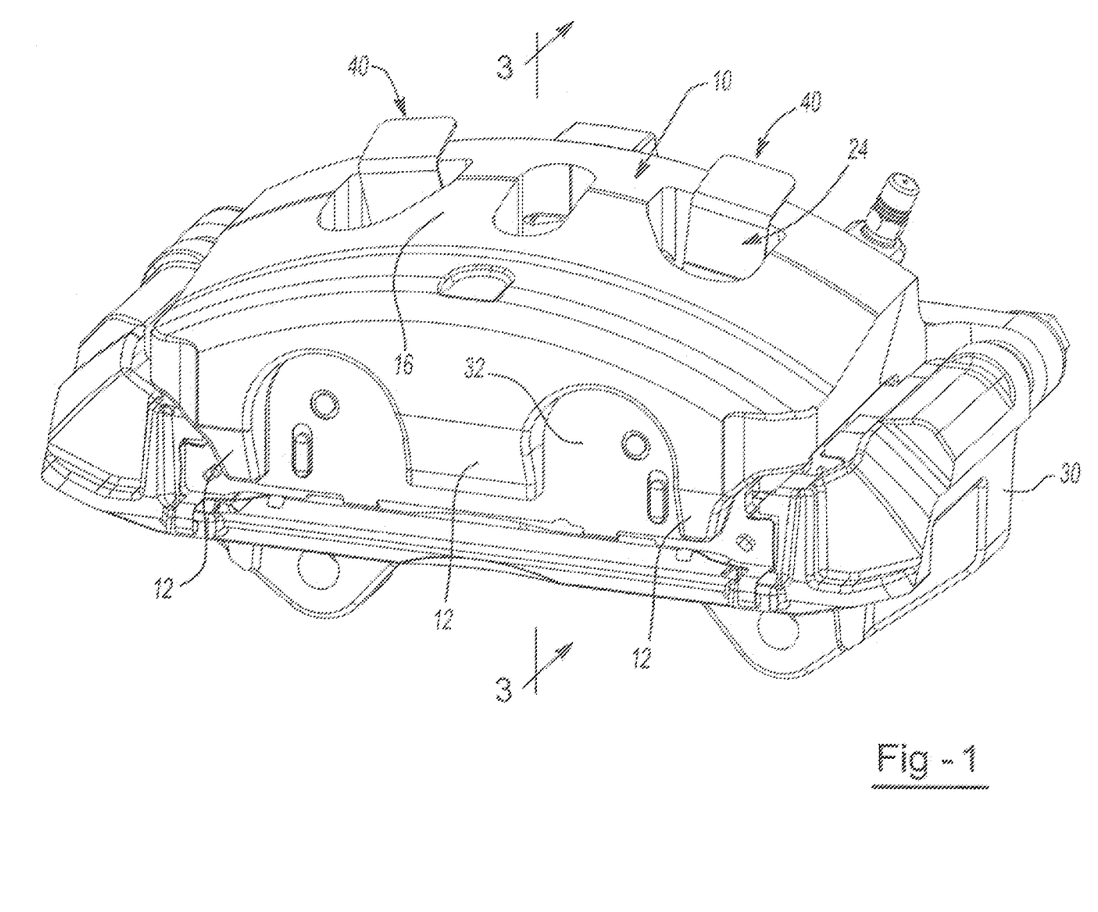
FIG. 1 illustrates an example of a completed brake system that includes heat transfer preventers.

FIG. 1 illustrates one possible brake assembly 2 with two heat transfer preventers 40. The brake assembly 2 includes a support bracket 30, a caliper 10, and a brake pad 32. The caliper includes fingers 12 connected to a bridge 10. The bridge 10 includes windows 24 that the heat transfer preventers 40 extend through.

Figure 2:
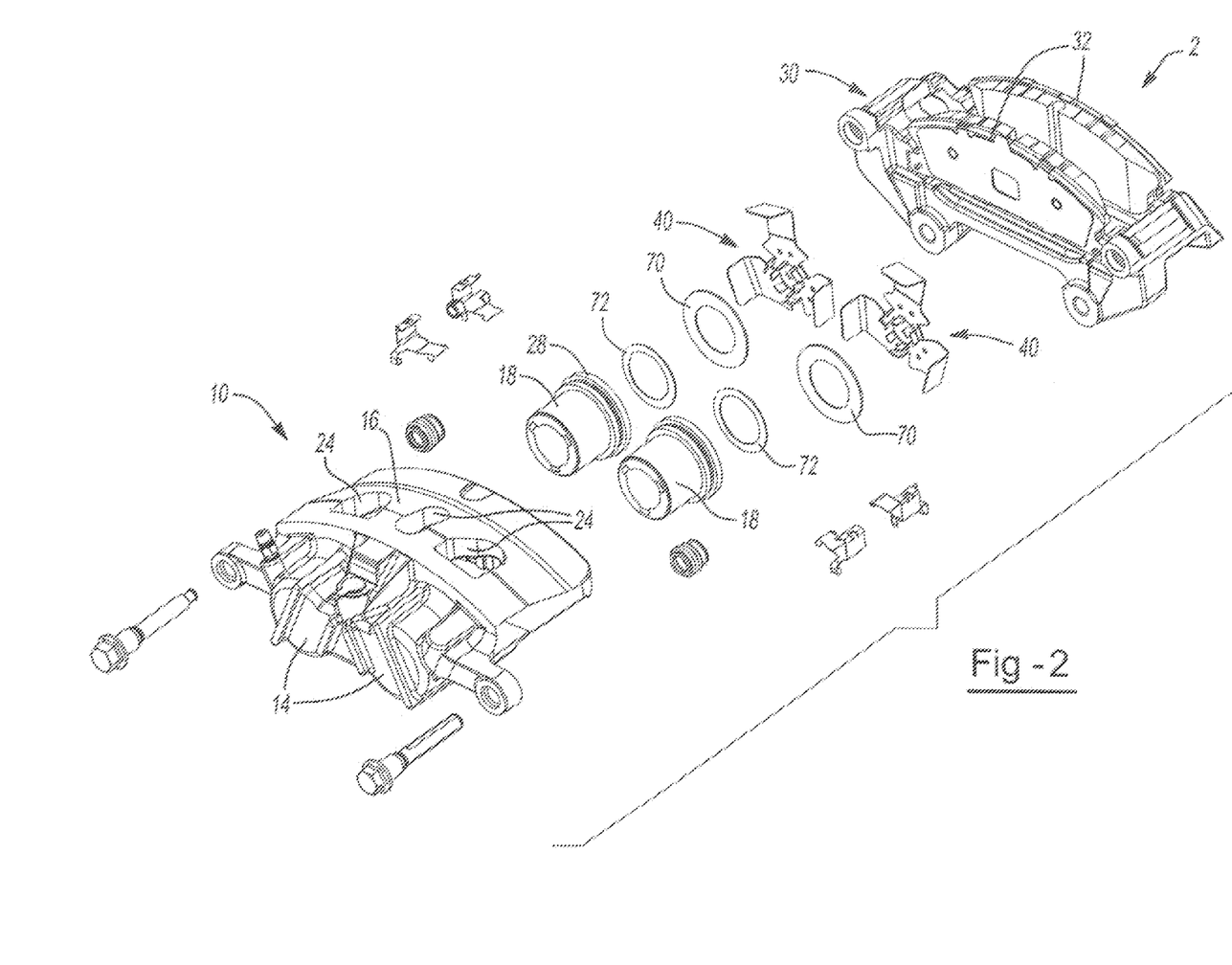
FIG. 2 illustrates an exploded view of a brake system including heat transfer preventers.

FIG. 2 is an exploded view of one possible brake assembly 2. The brake assembly 2 includes a caliper 10, the caliper 10 includes a bridge 16 with windows 24 in the bridge 16. The bridge 16 is connected to two piston bores 14. Each piston bore 14 houses a piston 18. Attached to the piston 18 are a piston boot 28, a heat transfer preventer 40, a support washer 70, and an insulator ring 72. One possible support bracket 30 with brake pads 32 are shown.

Figure 3:
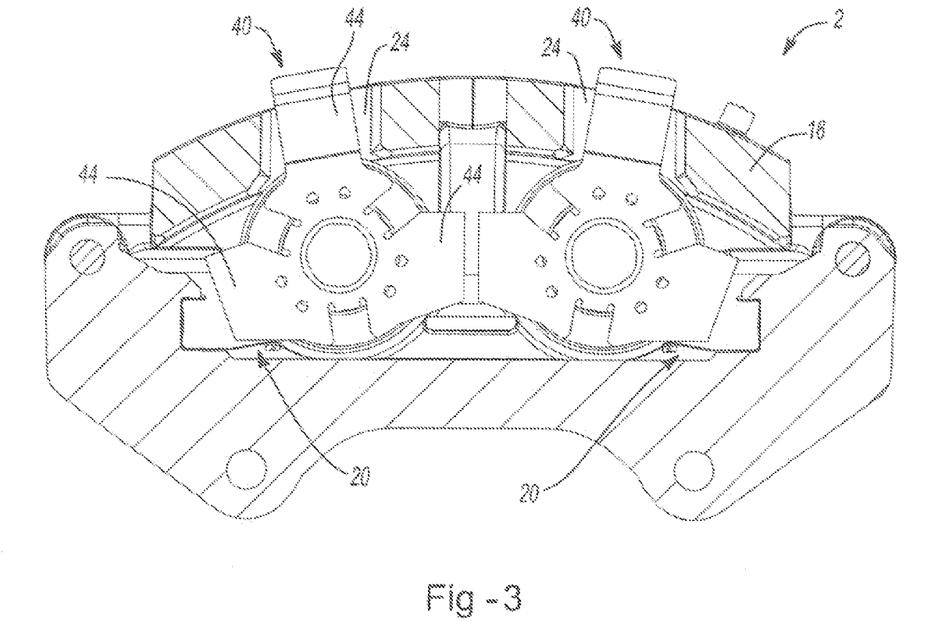
FIG. 3 illustrates a cross-sectional view along lines 3-3 of FIG. 1.

FIG. 3 illustrates a cross-section of the brake assembly 2 of FIG. 1 along line 3-3. The brake assembly includes two heat transfer preventers 40. The heat transfer preventers each include three convection plates 44. As illustrated one of the convection plates 44 extends around an outside 20 of the caliper 10, one of the convection plates 44 extends into a center recess 22 of the caliper 10, and one of the convection plates extends through a window 24 in the bridge 16 of the caliper 10.

Figure 4:
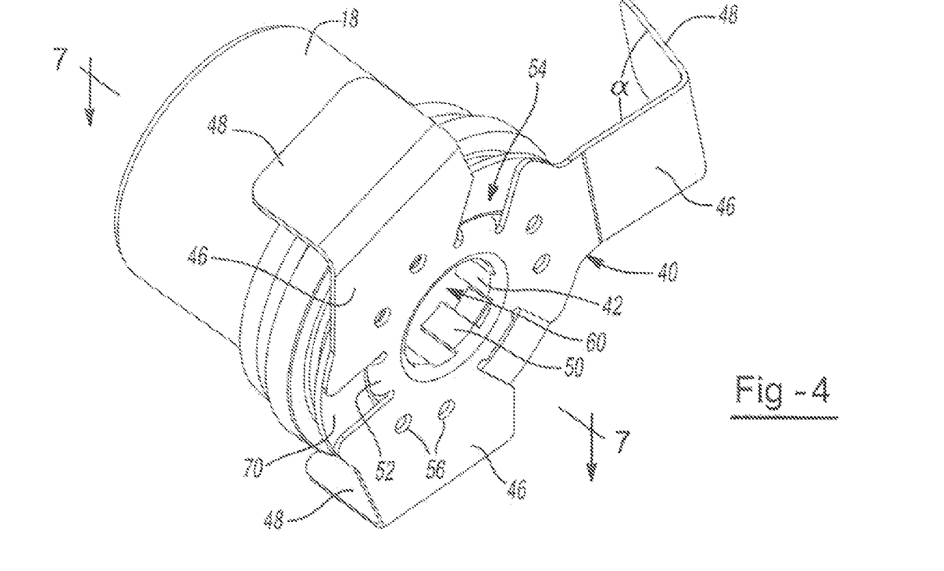
FIG. 4 illustrates one possible configuration for a heat transfer preventer attached to a piston.

FIG. 4 illustrates of close-up view of a heat transfer preventer 40 attached to a piston 18. A support washer 70 and an insulator ring (not shown) are located between the piston 18 and the heat transfer preventer 40. The heat transfer preventer 40 includes a body portion 42. The body portion includes a center hole 60 with internal fingers 50 extending from an edge of the center hole 60. The body portion 42 includes external fingers 52 that extend from an external edge of the body portion 42. The external fingers 52 are bent and extend towards the center hole 60 and the internal fingers 50 and create a slot 54 in the body portion. The external fingers 52 attach the heat transfer preventer 40 to the piston 18 and create a compressive force against an internal wall of the piston 18. The body portion further includes through holes 56. The heat transfer preventer 40 includes convection plates 44 that extend away from the body portion 42. The convection plates 44 include a coplanar portion 46 and an angled portion 48. The angled portion 48 forms an angle (α) with the coplanar portion 46.

Figures 5, 6, 7:
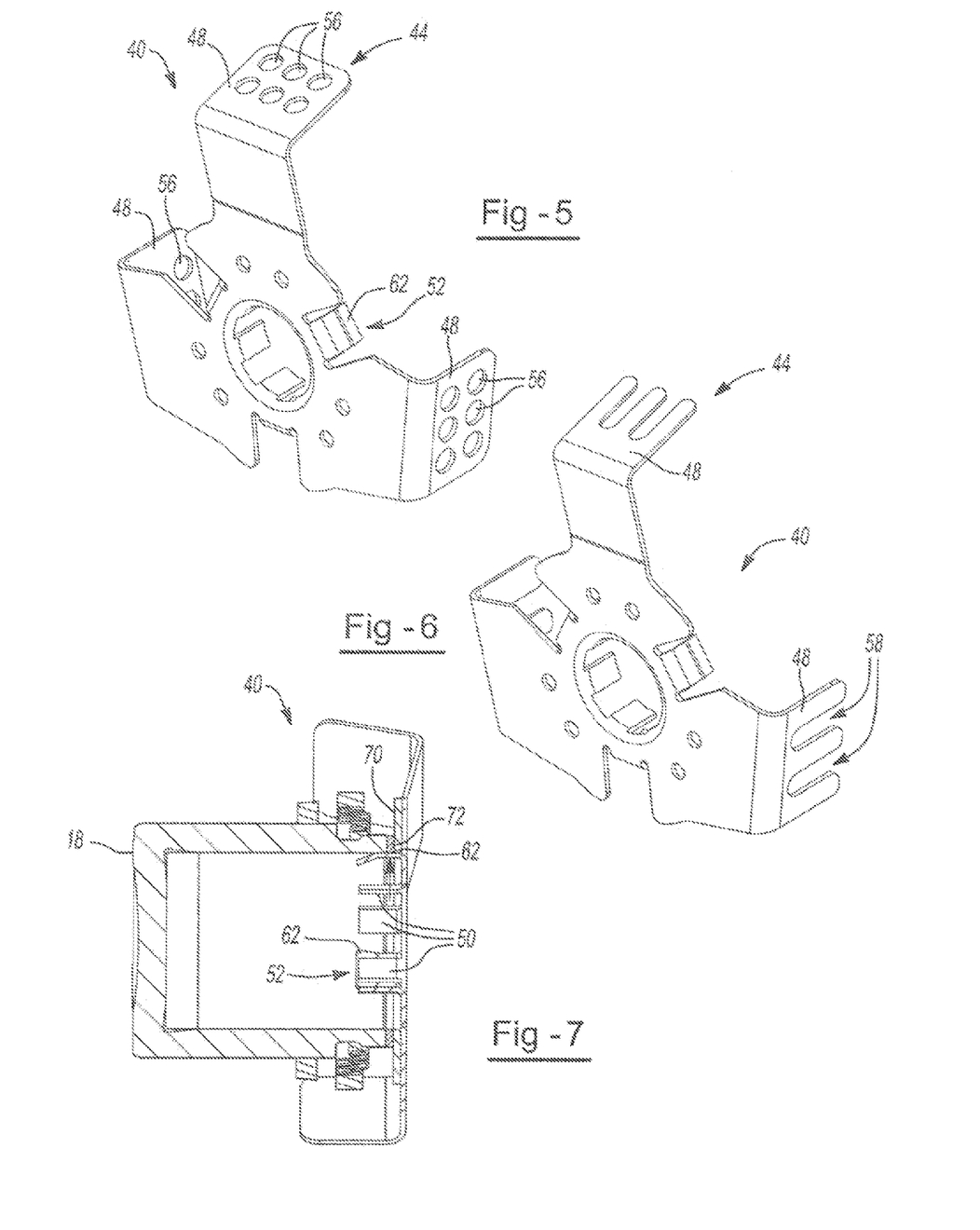
FIG. 5 illustrates another possible configuration for a heat transfer preventer.
FIG. 6 illustrates yet another possible configuration for a heat transfer preventer.
FIG. 7 illustrates a cross-sectional view along lines 7-7 of FIG. 4 of a heat transfer preventer attached to a piston.

FIG. 5 illustrates another embodiment of the heat transfer preventer 40. The angled portion 48 of the convection plates 44 include through holes 56. The external finger 52 is illustrated as including snaps 62 that attach to an internal wall of a piston (not shown) so that the heat transfer preventer 40 is attached to the piston (not shown).

FIG. 6 illustrates another embodiment of the heat transfer preventer 40. The angled portion 48 of the convection plate 44 includes cutouts 58.

FIG. 7 is a cross-sectional view of FIG. 4 along 7-7. As illustrated the external fingers 52 extend into the piston 18 and the snaps 62 on the external fingers 52 connect the heat transfer preventer 40 to the piston 18. The external fingers 52 create a force on the inside of the piston as indicated by the arrow. The internal fingers 50 extend from the center hole 60 of the heat transfer preventer 40 into the piston 18, but the internal fingers 50, as illustrated, are free of contact with the piston 18. The heat transfer preventer 40 is separated from the piston 18 by a support washer 70 and an insulator ring 72.

Figure 8:
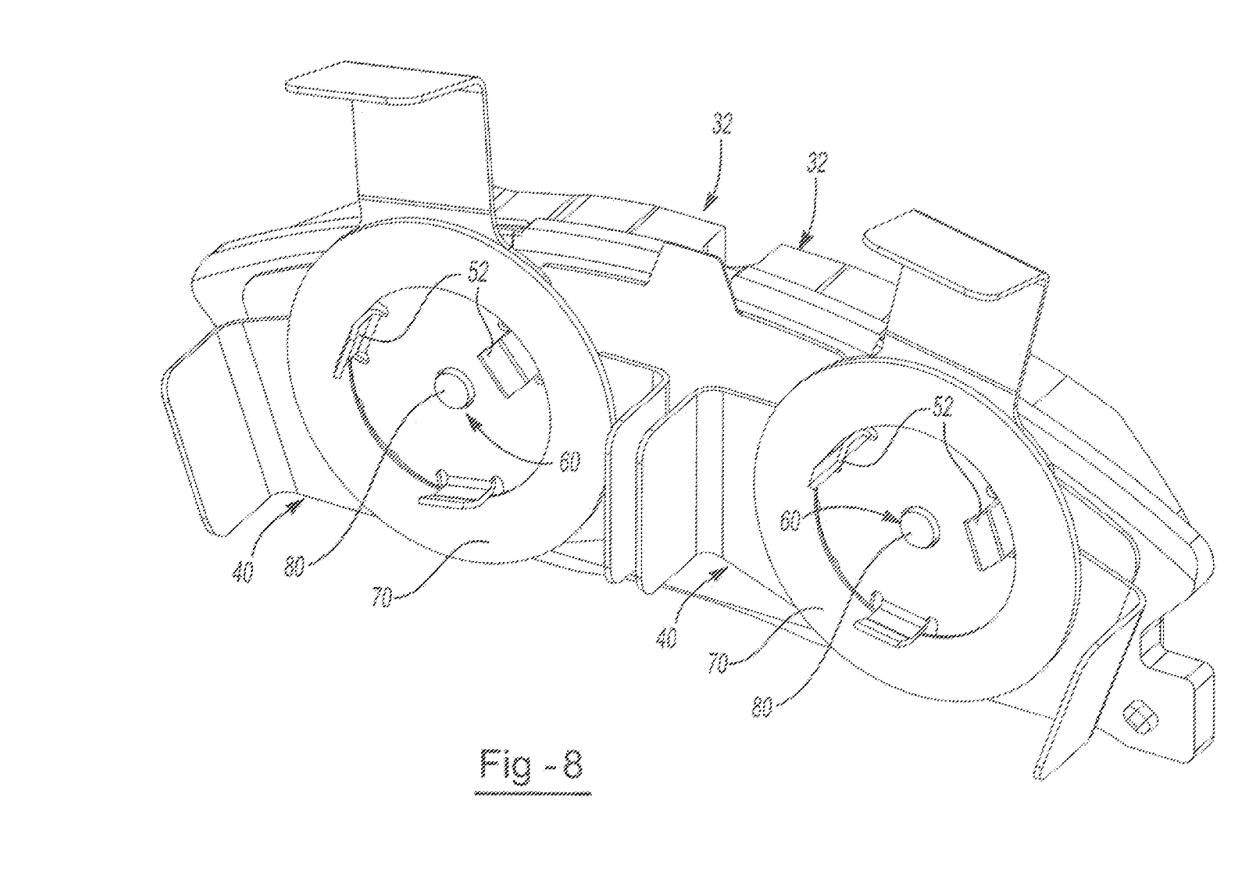
FIG. 8 illustrates a brake pad that includes one possible heat transfer preventer attached.

FIG. 8 illustrates one possible heat transfer preventer 40 of the teachings herein that attaches to a brake pad 32. The brake pad 32 as show is used in conjunction with a caliper (not shown) that includes two pistons. The heat transfer preventers 40 include center holes 62 so that an fastener 80 can attach the heat transfer preventers to the brake pad 32. The external fingers 52 as illustrated attach a support washer 70 to the heat transfer preventer 40.

Figure 9:
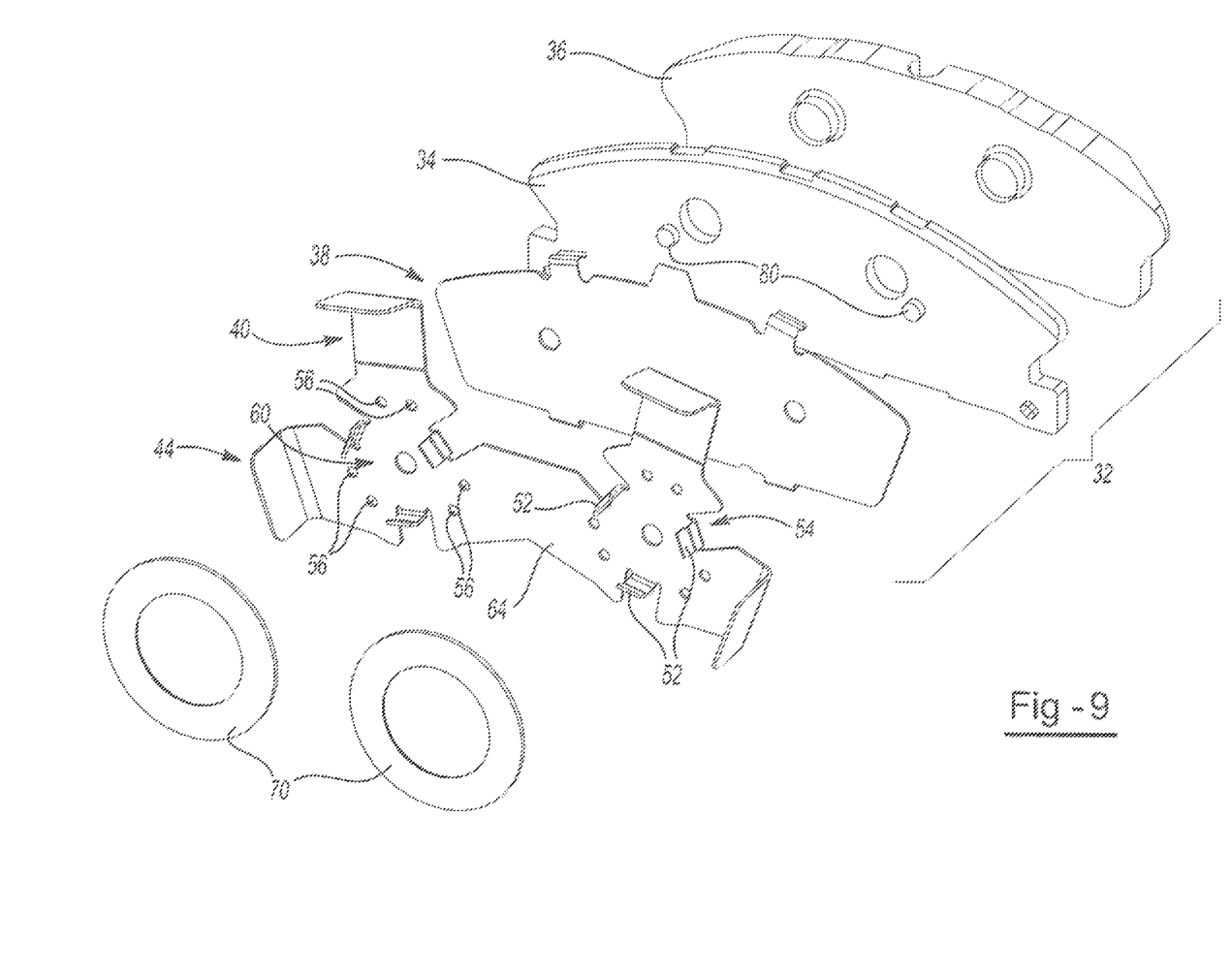
FIG. 9 illustrates an exploded view of a brake pad and another possible heat transfer preventer of the teachings herein.

FIG. 9 illustrates an exploded view of a brake pad 32 assembly that includes one possible heat transfer preventer 40 of the teachings herein. The brake pad 32 includes a pressure plate 34, friction material 36, a shim 38, and a fastener 80 that extends from the pressure plate 34, through the shim 38 and the center hole 60 of the heat transfer preventer 40 so that the heat transfer preventer 40 is attached to the brake pad 32. The heat transfer preventer 40 is a unitary piece for a dual piston brake assembly. The heat transfer preventer 40 includes a connection region 64 so that the unitary heat transfer preventer moves with both pistons simultaneously during a brake apply. The heat transfer preventer includes convection plates 44, external fingers 52, slots 54, through holes 56, and a center hole 60. The external fingers 52 attach to the respective pistons (not shown) so that the heat transfer preventer 40 and the brake pad 32 move as one unit during a brake apply, a brake retract, or any time therebetween.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

I claim:

1. An article comprising:
   a heat transfer preventer comprising:
   a. a body portion that includes one or more center holes;
   b. one or more convection plates that are directly connected to and extend from an external edge of an outer periphery of the body portion for moving heat away from the body portion, a piston, a brake pad, brake fluid or a combination thereof;
   c. one or more unitary attachment devices including; internal fingers that are directly connected to and extend from an inside edge of the one or more center holes so the internal fingers are juxtaposed to an inside wall of the piston; and one or more external fingers that connect the body portion to the inside wall of the piston, a fastener, or both
      wherein at least one of the one or more unitary attachment devices provide for attachment of the heat transfer preventer to the piston, the brake pad, a shim or a combination thereof.

2. The article of claim 1, wherein the one or more convection plates includes a coplanar portion and an angled portion; the coplanar portion being coplanar with the body portion and the angled portion being attached to the coplanar portion and extending at an angle away from the body portion and the coplanar portion so that the angled portion is in a different plane than both the body portion and the coplanar portion.

3. The article of claim 1, wherein the heat transfer preventer is one unitary structure.

4. The article of claim 2, wherein the heat transfer preventer is formed from one piece of material.

5. The article of claim 1, wherein the one or more unitary attachment devices are located in the one or more center holes and extend away from the body portion so that the heat transfer preventer attaches to an inside wall of the piston.

6. The article of claim 1, wherein the one or more external fingers extend from a central portion of the heat transfer preventer so that the external fingers are compressed when the external fingers are attached to an inside wall of the piston.

7. The article of claim 1, wherein body portion includes one or more slots and the one or more slots include excess material that angles at substantially a right angle to the body portion forming an external finger.

8. The article of claim 1, wherein the one or more external fingers contact an inner wall of a piston substantially along a length and a width of the external finger.

9. The article of claim 1, wherein the one or more convection plates includes only a base.

10. The article of claim 1, wherein the one or more unitary attachment devices are free of any separate fasteners that attach the heat transfer preventer to the piston, the brake pad, or both.

11. The article of claim 1, wherein the body portion includes one or more through holes so that convection of heat through the heat transfer preventer to the piston is interrupted and minimized.

12. The article of claim 1, wherein the heat transfer preventer includes one or more slots that interrupt convection of heat through the heat transfer preventer to the piston, wherein the slots are formed from bending away the one or more external fingers from the body portion.

13. The article of claim 1, wherein the heat transfer preventer includes three convection plates.

14. The article of claim 2, wherein the coplanar portion, the angled portion, or both include a plurality of holes, slots, cuts, slits, cutouts, or a combination thereof to improve convective cooling of the convection plate.

15. The article of claim 1, wherein the heat transfer preventer includes a support washer, and the support washer is located between the body portion of the heat transfer preventer and the piston.

16. A brake system comprising:
a. the article of claim 1;
b. a caliper housing including:
  i. one or more fingers;
  ii. one or more piston bores that each include:
    1. a piston and
    2. brake fluid;
  iii. a bridge connecting the one or more fingers and the one or more piston bores;
wherein the heat transfer preventer is attached to the piston via the one or more unitary attachment devices so that the heat transfer preventer and the piston move in unison during a brake apply, a brake retract, or any time therebetween.

17. A brake system comprising:
a. an article comprising:
  i. a heat transfer preventer comprising:
    1. a body portion and
    2. one or more convection plates that are connected to and extend from an external edge of an outer periphery of the body portion;
  wherein the body portion includes one or more unitary attachment devices for attachment to a piston, a brake pad, a shim, or a combination thereof;
b. a caliper housing including:
  i. one or more fingers;
  ii. one or more piston bores that each include:
    1. a piston and
    2. brake fluid;
  iii. a bridge connecting the one or more fingers and the one or more piston bores;
  iv. one or more windows in the bridge of the caliper housing;
    wherein the heat transfer preventer is attached to the piston via the one or more unitary attachment devices so that the heat transfer preventer and the piston move in unison during a brake apply, a brake retract, or any time therebetween;
wherein one of the one or more convection plates of the heat transfer preventer extends through one window in the bridge of the caliper housing;
one of the one or more convection plates extends around an outside of the caliper housing; and
one of the one or more convection plates extends into a center recess in the caliper housing.

18. The brake system of claim 17, wherein the brake system includes an insulator ring attached to the body portion, and the insulator ring is located between a brake pad and the heat transfer preventer so that heat transfer between a brake pad and the piston is inhibited.

19. The article of claim 1, wherein the body portion is generally flat.

* * * * *